Aug. 8, 1950     W. A. SCHULZE ET AL     2,517,934
PRODUCTION OF ALKYL DISULFIDES
Filed Nov. 18, 1946
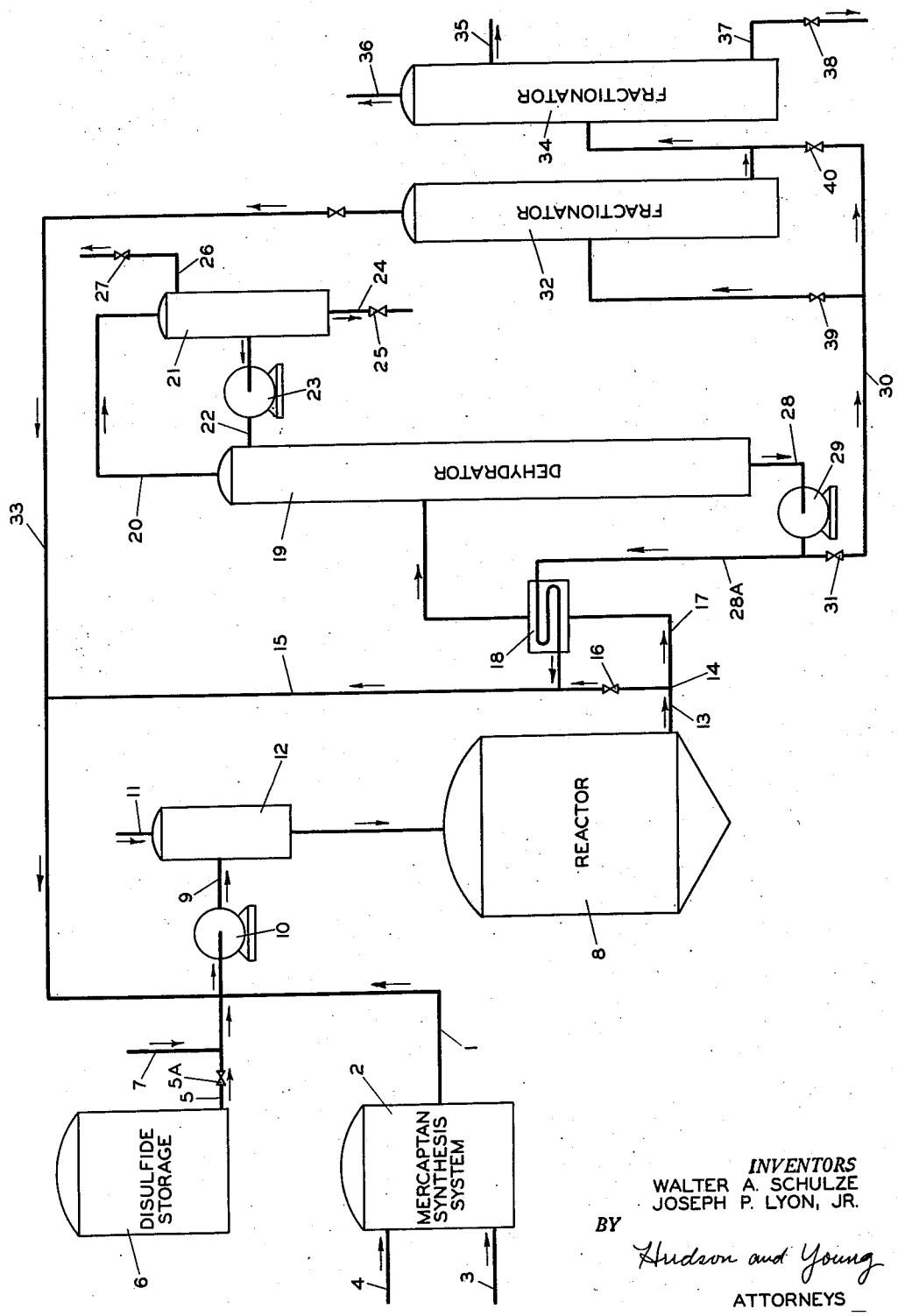
*INVENTORS*
WALTER A. SCHULZE
JOSEPH P. LYON, JR.
BY
*Hudson and Young*
ATTORNEYS Patented Aug. 8, 1950

2,517,934

UNITED STATES PATENT OFFICE 2,517,934

PRODUCTION OF ALKYL DISULFIDE

Walter A. Schulze, Bartlesville, Okla., and Joseph P. Lyon, Jr., Phillips, Tex., assignors to Phillips Petroleum Company, a corporation of Delaware Application November 18, 1946, Serial No. 710,492

12 Claims. (Cl. 260—608)

The present invention relates to a process for the production of alkyl disulfides. In a more specific aspect it relates to the production of alkyl disulfides from mercaptans containing less than 20 carbon atoms to the molecule.

In the past, small concentrations of mercaptan such as those naturally occurring in petroleum oils have been oxidized to disulfides and polysulfides by various methods. For example, in the manufacture of gasoline, the oxidation of mercaptans has been practiced for the purpose of eliminating their obnoxious odor. However, in such instances, the concentration of mercaptan is very small, generally in the order of 0.01 to 0.03 per cent. The separation of the small amounts of disulfide produced in these processes is obviously impractical from an economic viewpoint. Furthermore, operating difficulties involved in their separation would generally be very great, since the disulfides produced often boil in the same range as the gasoline. It is obvious, therefore, that such methods would not be suitable for the production of disulfides in a practical manner.

It is an object of the present invention to provide a process for the production of alkyl disulfides. It is a more specific object of the present invention to provide a process for the catalytic oxidation of selected mercaptans to form alkyl disulfides. It is a further object of the present invention to provide a process for the catalytic oxidation of mercaptans in a continuous recycling type of process. It is an additional object of the invention to produce alkyl disulfides by the catalytic oxidation of mercaptans wherein a unique azeotropic dehydration system is utilized for maintaining catalyst life.

We have now found that alkyl disulfides can be produced in economically significant quantities by a continuous catalytic oxidation process comprising the steps:

(a) Continuously circulating a mixture of disulfide and mercaptan wherein the disulfide serves as a solvent for fresh unconverted mercaptan which is added in controlled proportions to the total feed;

(b) Dissolving an oxygen containing gas in said mixture;

(c) Passing said mixture over a suitable catalyst;

(d) Dehydration of the stream by a distillation process.

A significant feature of the present invention is the recycling of effluent through the catalyst bed with continuous addition of mercaptan in a proportion such that complete oxidation of mercaptan to disulfide is effected. By operating in this manner disulfide may be removed from the system continuously as it is produced, and at the same time, a suitable solvent is furnished for fresh mercaptan addition.

Another important feature lies in the manner in which dehydration of the circulating stream is regulated. In the oxidation of mercaptans to disulfide the reaction proceeds according to the following equation:

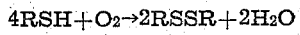
$$4RSH + O_2 \rightarrow 2RSSR + 2H_2O$$

Thus it is obvious that without suitable provision for its removal, water will rapidly accumulate in the system. Since the oxidizing catalyst employed will generally comprise a soluble metallic salt adsorbed in aqueous phase on an inert supporting material, water in the stream in excess of the requirements for maintaining the aqueous phase in the catalyst bed will carry active material into the circulation. This loss not only degenerates the catalyst but also causes caking and channeling in the bed, corrosion of lines and equipment, etc. On the other hand, if complete dehydration of the stream is effected, the water required for maintainance of the adsorbed catalyst phase is soon removed and catalyst activity is rapidly exhausted.

By the method of our invention a controlled proportion of the circulating disufide stream is passed through a distillation type of dehydrating system from which the dry effluent is recombined with the undehydrated portion. Often a convenient method of operation is to employ a suitable azeotropic agent as an aid in dehydration.

A further advantage of the present invention lies in the substantially complete conversion of mercaptans to disulfides without loss in the formation of higher polysulfides.

Other advantages in our invention will be adequately pointed out by the description of the accompanying diagrammatic sketch which illustrates one type of apparatus in which the objects of the invention may be accomplished. In this explanation, reference is made to specific feed stocks and operating conditions, both as an aid to clarity in description and as an example of the operation of our invention. Limitation of the process to these specific materials and conditions is neither implied nor intended.

Referring to the drawing, tertiary butyl mercaptan is introduced into the process through line 1. The source of the mercaptan feed may be a mercaptan synthesis step 2 in which an olefin, in this instance isobutylene, is introduced through line 3 and blended in controlled proportions with hydrogen sulfide introduced through line 4, together with a diluent when desired, the blend passed over a suitable catalyst such as silica-alumina, and the product purified according to conventional methods. Any other source of mercaptan will be equally suitable.

Tertiary dibutyl disulfide is introduced through line 5 and valve 5A from storage 6 and commingled with the mercaptan in proportion of about 20 parts disulfide to one part mercaptan. If desired, an azeotropic agent such as benzene or n-heptane may be added to the stream through line 7. The blend is fed to the reactor 3 through line 9 containing pump 10. Air is introduced through line 11 and intimately mixed with the feed in chamber 12. The mercaptan mixture flows through the catalyst bed, which may comprise cupric chloride adsorbed in aqueous phase on fuller's earth or other inert supporting material, under conditions for substantially complete oxidation of the mercaptan to tertiary dibutyl disulfide. In the event that an azeotropic agent is employed its solubility characteristics for water will be a factor in determining operating conditions in the reactor.

After passing through the catalyst, the effluent flows through line 13 to point 14 where a portion of the stream passes through line 15 for recycling to the reactor. The proportion of undehydrated disulfide in the recycle depends upon the water content of the feed streams, the volume of catalyst employed, etc., and is controlled by adjustment of valve 16. The remaining portion of the effluent stream passes through line 17 containing heat exchanger 18 to the dehydrating column 19 where the temperature is controlled to maintain a continuous reflux. Vapors from column 19 pass through line 20 to the reflux accumulator 21 where they are condensed and separated by gravity into aqueous and hydrocarbon phases. The lighter hydrocarbon layer, which will be largely comprised of the azeotropic agent when so operating, is returned to the dehydrator through line 22 containing pump 23. The heavier water layer is drawn off periodically through line 24 containing valve 25. Air is vented from the system through line 26 containing valve 27.

Effluent is continuously removed from the dehydrator through line 28 containing pump 29. Withdrawal of product is made through line 30 at a rate substantially equivalent to the rate of conversion of mercaptan to disulfide and regulated in volume by suitable adjustment of valve 31. The remaining portion of the dehydrated stream continues through line 28a and heat exchanger 18 and is commingled with the undehydrated stream in line 15 for recycling to the reaction where it serves as a solvent for fresh mercaptans.

When the recycling disulfide stream is established through line 15, valve 5A in line 5 is closed. By operating in this manner, the mercaptan is fed into a constantly recycling disulfide stream, while the dehydrated disulfide stream is constantly removed through line 30 at a rate substantially equal to that of the mercaptan feed from line 1, and disulfide from storage 6 is admitted only as needed in changing the rate of operation, for makeup of unavoidable losses due to leakage, and the like. If it is desired to increase or decrease the rate of introduction of mercaptan into the system during the course of the operation and thereby change the ratio of mercaptan to disulfide, a valve (not shown) in line 1 may be used for this purpose.

When operating with an azeotropic agent, a stripping column 32 and recycle line 33 are included in the system for separation and return of the said azeotropic agent. The crude disulfide is distilled under vacuum in the fractionator 34 and removed to storage through line 35. Provision is made for removal of light ends through line 36 and any heavy bottoms via line 37 containing valve 38. Pressure in the vacuum fractionator will proferably be about four mm. or less. The azeotropic column is put in use by opening valve 39 and closing valve 40. When it is not desired to use this column valve 39 is closed and valve 40 is opened.

The catalyst employed for the oxidation will generally be of the fixed bed type comprising an inert supporting material such as clay, fuller's earth, and the like, on which a suitable metallic salt, preferably cupric chloride, is adsorbed in aqueous phase.

The oxygen containing gas, which may be air, is introduced into the system under a pressure in the approximate range of 50 to 100 pounds per square inch gauge. More effective admixture with the reactants is obtained by introducing the gas through a porous plate or tube located in the mixing chamber.

Effective oxidation of mercaptan to disulfide will generally be obtained between about 80 and about 120° F. However, when operating with certain azeotropic agents such as, for example, normal heptane, elevation in temperature is usually desirable in order to accomplish the removal of water. The temperature required is dependent upon the solubility relationships existing between the particular azeotropic agent and water. In some instances it may be considered necessary to operate at temperatures as high as about 150° F. while in other cases much lower temperatures, say around 100° F. or less, will insure satisfactory removal of water. Pressures in the reaction zone will, in general, be in the range 75 to 125 pounds per square inch gauge, depending upon the operating temperature, the particular mercaptan employed, etc.

The concentration of water required to maintain maximum activity of the catalyst will vary with the volume of catalyst employed, rate of operation, water content of the feed stock, etc. However, under fixed conditions of operation this concentration will be substantially constant and may be maintained by a suitable adjustment of the proportion of effluent circulated to the dehydrator. Usually, observation of the rate of accumulation of water in the accumulator will furnish a convenient criterion for regulating the dehydrating operation. In general, the water content of the recycled material should be controlled so that the partial pressure of water vapor in the recycled stream is maintained equal to the vapor pressure of the maintained aqueous phase in the catalyst bed.

In operating the dehydrating column without an azeotropic agent or entrainer, a substantial portion of water is removed overhead by simple distillation.

Rate of flow through the reaction zone will generally be in the range of from about 1.5 to four volumes of feed per volume catalyst per hour.

*Examples*

A stream of tertiary butyl mercaptan was introduced into the system shown in the drawing, through line 1 at the rate of 35 gallons per hour. The mercaptan was derived from a synthesis step 2 in which 75 per cent isobutylene (1 part), 75 per cent hydrogen sulfide (1.5 parts), and 4 parts n-octane diluent were introduced through lines 3 and 4, respectively, and treated over silica-alumina catalyst at a pressure of 750 pounds per square inch gauge and a temperature which ranged from 120° F. at the inlet to the catalyst chamber to 230° F. at the outlet. (Exothermic nature of the reaction accounts for the temperature difference.) The product was stabilized in a series of two strippers operated at 65 and 20 pounds per square inch gauge, respectively, to remove unreacted hydrogen sulfide and isobutylene, and associated carbon dioxide and light paraffins. The mercaptan was separated from the octant diluent in a fractionator operated at atmospheric pressure and an overhead temperature of 215° F., and was further purified to a concentration of 90 per cent by removal of lighter materials overhead in a second tower operated at about 5 pounds per square inch gauge and a kettle temperature of 155° F.

With this mercaptan stream there was introduced into the circulating stream 2500 cubic feet per hour of air through line 11. A circulation of 20,000 gallons per hour was maintained through the system which contained a total of 20,000 gallons of n-heptane. Tertiary butyl disulfide was introduced through line 5 to a total of 5 per cent of the volume of the circulating material, or approximately 1000 gallons. A ratio of 30 parts disulfide to one of mercaptan was thus maintained. Conditions in the reactor 8 were maintained at 80 pounds per square inch gauge and at 135° F. The catalyst bed which had a volume of 280 cubic feet was prepared by impregnating 16 to 30 mesh fuller's earth with 2.5 per cent cupric chloride. The final catalyst composition contained 10 per cent water. The circulation rate of disulfide-mercaptan stream was thus about 0.5 volume per hour, or 10 volumes per hour of total circulation. A total of 5 per cent of the moist effluent from the reactor was recycled to said reactor to maintain the desired moisture content in the stream and, in turn, in the catalyst, while the remainder of the reactor effluent was fed to the dehydrator column. The disulfide produced was fractionated in tower 34 at a pressure of 5 mm. of mercury. Tertiary butyl disulfide was removed through line 35 at the rate of 23 gallons per hour.

The run was terminated after 1660 hours of operation at which time no noticeable decline in catalyst activity had been observed. A yield of 86.3 per cent of disulfide, based on the tertiary butyl mercaptan content of the 90 per cent mercaptan feed stream, was obtained.

Another run is carried out under the conditions described above except that the n-heptane is omitted, and replaced by an equal volume of tertiary butyl disulfide. The yield of disulfide is in the neighborhood of 90 per cent.

We claim:

1. A process for the preparation of alkyl disulfides which comprises continuously circulating a solution of a mercaptan dissolved in alkyl disulfide produced in the process through a catalytic oxidation zone in the presence of dissolved oxygen-containing gas in contact with an oxidation catalyst to effect oxidation of the mercaptan to the corresponding disulfide, at least partially dehydrating the reaction effluents to remove water of reaction therefrom, recycling one portion of the disulfide contained in the reaction effluent to serve as solvent for the mercaptan, and recovering alkyl disulfide product from another portion of the effluent.

2. A process for the preparation of alkyl disulfides by the oxidation of mercaptans, which comprises dissolving a mercaptan in alkyl disulfide produced in the reaction, introducing said solution together with a material forming an azeotrope with water produced in the reaction into an oxidation zone together with oxygen and carrying out said oxidation reaction in the presence of an oxidation catalyst, distilling from the products of oxidation an azeotrope comprising water to remove said water from the system, separating the azeotropic agent from water and returning said agent to the reaction, recycling a portion of the alkyl disulfide produced as solvent for mercaptan in the reaction, maintaining the concentration of mercaptan in the solution at a point which will insure complete oxidation, and recovering the remaining portion of the alkyl disulfide as a product of the process.

3. A process according to claim 2 wherein the mercaptan is one having less than 20 carbon atoms and the azeotropic agent is benzene.

4. A process according to claim 2 wherein the mercaptan is one having less than 20 carbon atoms and the azeotropic agent is n-heptane.

5. A process according to claim 2 wherein the mercaptan is one having less than 20 carbon atoms and the oxidation is carried out in the presence of air in contact with a cupric chloride oxidation catalyst at a temperature of between about 80 and 150° F.

6. A process for the preparation of alkyl disulfides which comprises continuously circulating a solution of an alkyl mercaptan dissolved in alkyl disulfide produced in the process through a catalytic oxidation zone in the presence of dissolved oxygen-containing gas in contact with an oxidation catalyst to effect oxidation of the mercaptan to the corresponding disulfide, recovering alkyl disulfide from one portion of the reaction effluent, partially dehydrating another portion of said effluent by incorporating therewith an azeotropic agent forming an azeotrope with water and distilling said azeotrope therefrom, and recycling thus-dehydrated reaction effluent to serve as solvent for the mercaptan.

7. A process for the preparation of alkyl disulfides which comprises continuously circulating a solution of an alkyl mercaptan dissolved in alkyl disulfide produced in the process with an azeotropic agent forming an azeotrope with water in the presence of an oxygen-containing gas in contact with an oxidation catalyst to effect oxidation of the mercaptan to the disulfide, recovering alkyl disulfide from one portion of the reaction effluent, dehydrating another portion of said effluent by distilling water-containing azeotrope therefrom, and recycling thus dehydrated reaction effluent to serve as solvent for the mercaptan.

8. A process for the preparation of alkyl disulfides which comprises continuously circulating a solution of an alkyl mercaptan containing less than 20 carbon atoms to the molecule dissolved in alkyl disulfide produced in the process through a catalytic oxidation zone in the presence of dissolved oxygen-containing gas in contact with an oxidation catalyst to effect oxidation of the mercaptan to the corresponding disulfide, at least partially dehydrating the reaction effluents by distillation in the presence of a material forming an azeotrope with water produced in the reaction, recycling one portion of the disulfide contained in the reaction effluent to serve as solvent for the mercaptan, and recovering alkyl disulfide product from another portion of said effluent.

9. A process according to claim 8 wherein the alkyl mercaptan is tertiary butyl mercaptan and wherein the alkyl disulfide is tertiary butyl disulfide.

10. A process according to claim 8 wherein the oxidation catalyst is a cupric chloride catalyst.

11. A process according to claim 8 wherein the azeotropic material is benzene.

12. A process according to claim 8 wherein the azeotropic material is n-heptane.

WALTER A. SCHULZE.
JOSEPH P. LYON, Jr.

REFERENCES CITED

The following references are of record in the file of this patent:

UNITED STATES PATENTS

| Number | Name | Date |
|---|---|---|
| 2,094,485 | Buell | Sept. 28, 1937 |
| 2,194,851 | Guinot | Mar. 26, 1940 |
| 2,264,220 | Schulze | Nov. 25, 1941 |
| 2,284,273 | Franklin | May 26, 1942 |